Jan. 22, 1957
P. L. TORRE ET AL
2,778,953
ELECTRIC SYSTEM FOR MOTOR VEHICLES
Filed April 19, 1955
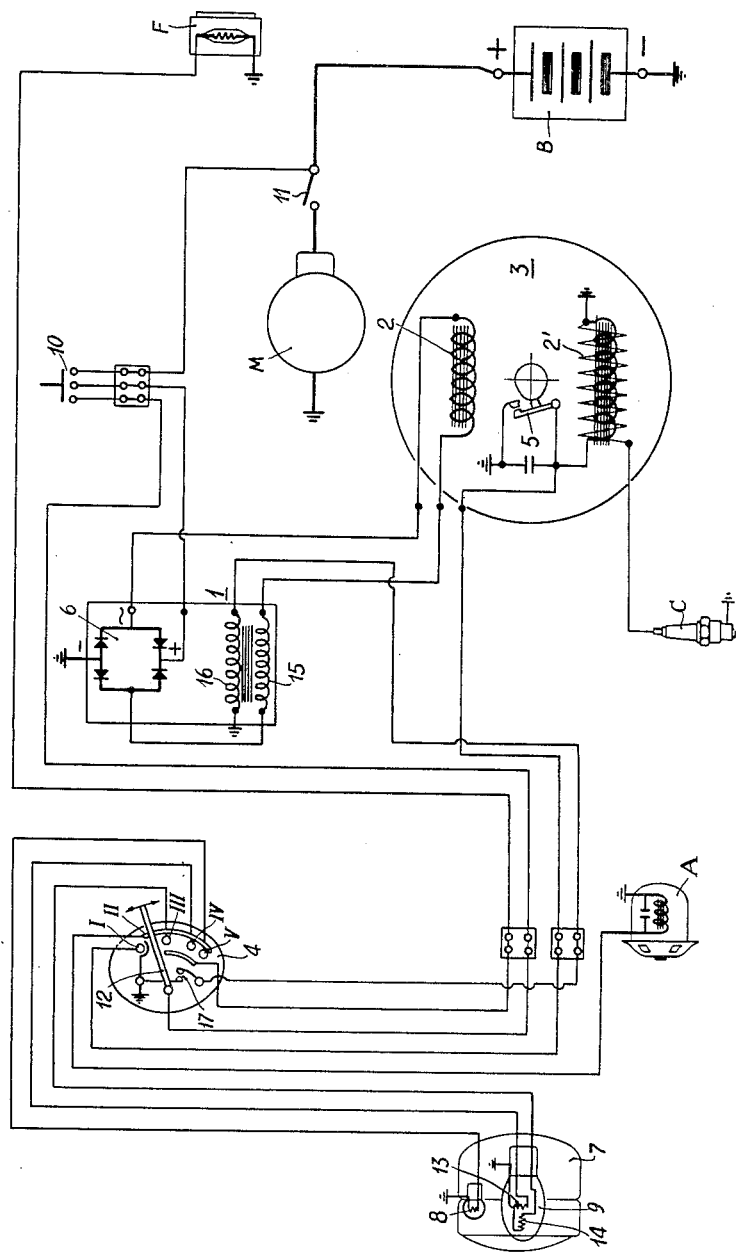
INVENTORS:
PIER LUIGI TORRE
BRENNO PRIMETTI United States Patent Office 2,778,953
Patented Jan. 22, 1957

2,778,953

ELECTRIC SYSTEM FOR MOTOR VEHICLES

Pier Luigi Torre and Brenno Primetti, Milan, Italy

Application April 19, 1955, Serial No. 511,008

Claims priority, application Italy April 22, 1954

2 Claims. (Cl. 307—10)

The present invention relates to improvements in electric systems for motor vehicles and more particularly to an electric system comprising the regulation of the charging current for the storage battery fed from A. C. generators.

In the prior art, there has already been described an electric circuit system for motorcycles, provided with an alternating current generator, whose current, suitably rectified, was used for charging the storage battery. From this battery was branched off the entire electric system for operating the lights and signals of the automotive vehicle. The ignition was obtained by utilizing the high voltage coil provided inside the flywheel magneto. By rectifying the whole charging current, produced in the low voltage coil, and also positioned inside the flywheel magneto, there would be obtained, during daylight running, without the headlights load, a remarkable charging current, which, under certain conditions, could be excessive for a correct charging of the battery. To prevent this, there was foreseen a current deviating relay, through which was flowing the whole rectified current and which, according to the operation by day time or at night, is constructed provided to insert wholly or in part the winding of said coil. Due to the highly pulsating character of the rectified current, other regulating arrangements did not prove to be very suitable.

In order to simplify the electric system and to increase its operating reliability, said deviating relay has been substituted, according to the present invention, with an "impedance transformer" which, due to the absence of moving contacts, is less expensive and offers less chances of inconveniences. Furthermore, there is obtained the advantage that the charging current gradient has the tendency to be remarkably reduced with the increase of the R. P. M.

In the accompanying drawing a diagram of an electric system for a motor vehicle is illustrated, which system is fed with a rectified alternating current, whereby according to the invention said "impedance transformer" is utilized.

The electric system, as shown diagrammatically, comprises a flywheel magneto 3, including a low voltage coil 2 for the lighting circuit and the electric horn, and a high voltage coil 2' for feeding the sparkplug C, as well as the switch 5, actuated by a cam. Further from the drawing are apparent, B is the storage battery, M the starting motor, A the electric horn, and F the tail light.

The lighting circuit comprises, besides the coil 2, the "impedance transformer" 1, which is a feature of the present invention, the rectifier 6, the switch 4, mounted on the steering handle, the front headlamp 7 with two bulbs of which bulb 8 has a single filament for city light, whereas bulb 9 has two filaments 13 and 14, respectively for the headlight proper and the dimmed headlight. The circuit is completed by the switch 11 in the connection between the battery B and the starting motor M, and the switch 10 mounted on the starting lever and connecting the rectifier 6, the battery B, and the switch 4. Said switch 4 has five positions with which a lever 12 cooperates, the latter being connected to the power supply: Position I, which is the stop position, in which the motor is grounded; position II, corresponding to the day time running with lights off, and wherein the secondary circuit of the battery charging impedance is open; position III for night driving, wherein the dimmed headlight 14 and the tail light F are on; position IV, for night driving, wherein the headlamp 13 and the tail light F are switched on; and position V, for night driving, wherein city light 8 and the tail light F are switched on. In all three positions III, IV and V, the secondary circuit of the battery charging impedance is closed.

The impedance transformer 1 is provided with a primary winding 15 and a secondary winding 16. The winding 15 is connected at one end to one side of the low voltage coil 2, arranged inside the flywheel magneto, and at the other end to the rectifying unit 6. The secondary winding 16 of this coil 1 has one end grounded, and the other end connected to a terminal on switch 4 for the headlamps, mounted on the steering handle. This end is grounded through the spring actuated switch 17. Normally, this last one is open and said one end of the coil 2 is isolated, but it is being grounded as soon as the small lever 12 of switch 4 is actuated so as to insert the one or the other filament of the headlamp.

Under conditions of daylight driving, when the whole rectified charging current would be too large for a correct charging of the battery, it is the impedance of the coil 1 that provides means to suitably adjust the charging current, and this even with rising R. P. M., inasmuch as, upon a R. P. M. rise there increases the frequency, and the voltage drop determined by the impedance also increases, to the full advantage of a convenient regulation of the charging current which thus takes up an asymptotic value.

As soon as there is inserted one of the headlights and the current drawn by same adds up to the charging current, through the connection of the coil 1 with the switch 4, the secondary 16 if said coil 1 is short-circuited thus causing a decrease of the primary impedance of the coil 1, that allows to the coil 2 to supply the maximum current needed for feeding the headlights and the charge of the battery. Of course even under such conditions there is the favorable effect of a decrease in the gradient of the charging voltage with the rise in the R. P. M. thanks to the impedance increment depending from the increased frequency.

Indeed, the values of the impedance transformer and the values of the other elements constituting the circuit in question may vary according to needs without therefore departing from the field of the present invention.

Having thus described the invention, what is claimed as new and desired to be secured by Letters Patent, is:

1. An electric circuit distributing system for automotive vehicles, connected to an alternating current line, comprising: an impedance transformer in combination with a flywheel magneto provided with a low voltage coil for the lighting circuit and the electric horn, with a high voltage coil for the ignition spark plug, and with a cam-operated switch; a storage battery; a starting motor; a headlight having three different light sources; a tail light; an electric horn; a switch, and a rectifier; said impedance transformer being adapted to regulate the battery charging current, respectively during daylight and night driving, and comprising, besides a primary winding inserted between said rectifier and the low voltage coil of the flywheel magneto, a secondary winding with one terminal thereof grounded and with the other terminal connected to a contact of said switch for operating the headlight so that when the latter is cut-in, said secondary winding is grounded, thus bringing about short-circuit operation of said secondary winding, thereby reducing the reactance of the winding connected in series with said low voltage coil of said flywheel magneto.

2. An electric system according to claim 1, said windings of said impedance transformer being such that the variation of said impedance caused by the frequency increase of the current with the increase in the R. P. M. of the motor, contributes to the reduction of the charging gradient of the storage battery to a value most suitable for the regulation of the charging current and the life of the battery.

References Cited in the file of this patent

UNITED STATES PATENTS

| | | |
|---|---|---|
| 1,680,149 | Gould | Aug. 7, 1928 |
| 2,117,019 | Conrad | May 10, 1938 |
| 2,117,141 | Breer et al. | May 10, 1938 |
| 2,557,298 | Leece et al. | June 19, 1951 |
| 2,660,702 | Arvidsson | Nov. 24, 1953 |

OTHER REFERENCES

Electrical Engineering, August 1947, pages 779 and 780.